(No Model.) 2 Sheets—Sheet 1.

W. T. FOX.
AIR COMPRESSOR.

No. 285,743. Patented Sept. 25, 1883.

WITNESSES
Chas. H. Caldwell.
H. G. Phillips.

INVENTOR
Wm. T. Fox.
by Geo. B. Selden
atty.

(No Model.) 2 Sheets—Sheet 2.
W. T. FOX.
AIR COMPRESSOR.
No. 285,743. Patented Sept. 25, 1883.
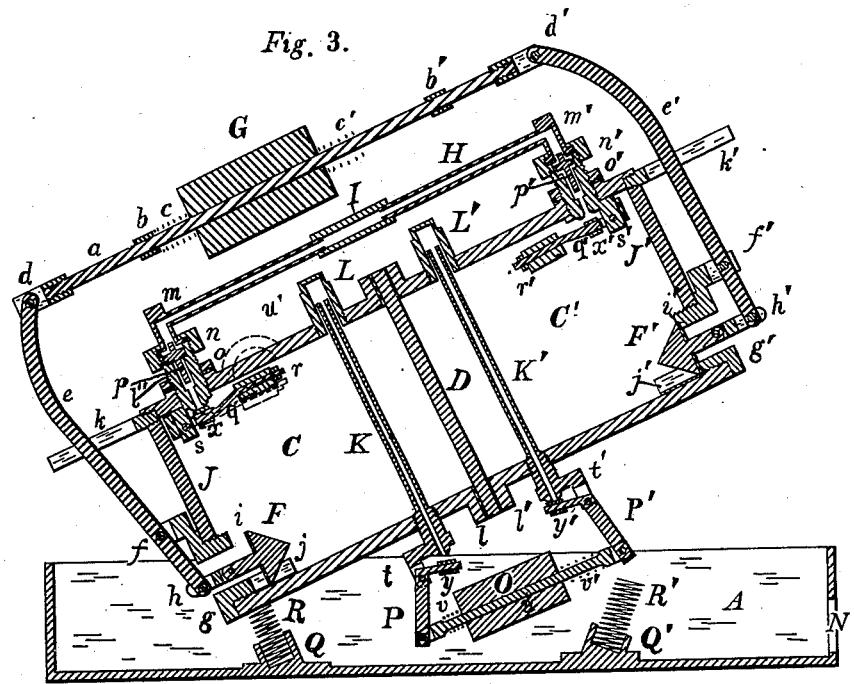
Fig. 3.
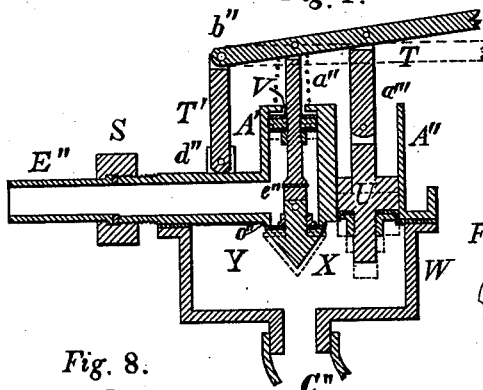
Fig. 4.
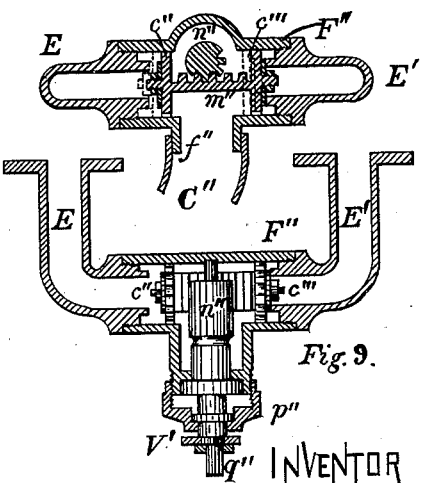
Fig. 5.
Fig. 6.
Fig. 8.
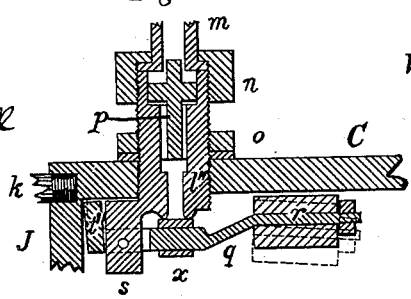
Fig. 7.
Fig. 9.
WITNESSES
Chas. H. Caldwell
H. G. Phillips.
INVENTOR
Wm. T. Fox
by Geo. B. Selden.
atty.
N. PETERS, Photo-Lithographer, Washington, D. C.

UNITED STATES PATENT OFFICE.

WILLIAM T. FOX, OF ROCHESTER, NEW YORK.

AIR-COMPRESSOR.

SPECIFICATION forming part of Letters Patent No. 285,743, dated September 25, 1883.

Application filed January 15, 1883. (No model.)

*To all whom it may concern:*

Be it known that I, WILLIAM T. FOX, of Rochester, Monroe county, New York, have invented an Improved Air-Compressor, of which the following is a specification, reference being had to the accompanying drawings.

My invention relates to an improved air-compressor designed more particularly for use in connection with apparatus for forcing beer, ale, &c., but capable of being used for other purposes; and my invention consists in so combining and arranging two oscillating chambers, separated by a diaphragm, with water inlet and outlet valves and air inlet and outlet valves, operated by the oscillating motion of the chambers, that the chambers are alternately filled and emptied with water and with air, which is delivered under pressure to any desired point.

My invention also consists in the various mechanical details of the apparatus, all as hereinafter more fully described and specified.

Figure 1:
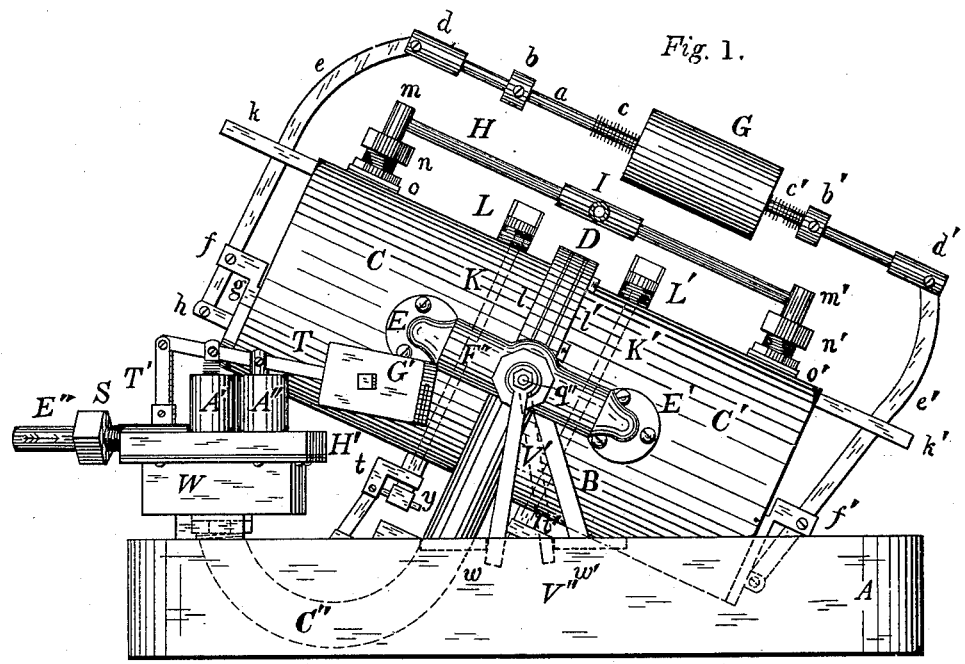
Figure 2:
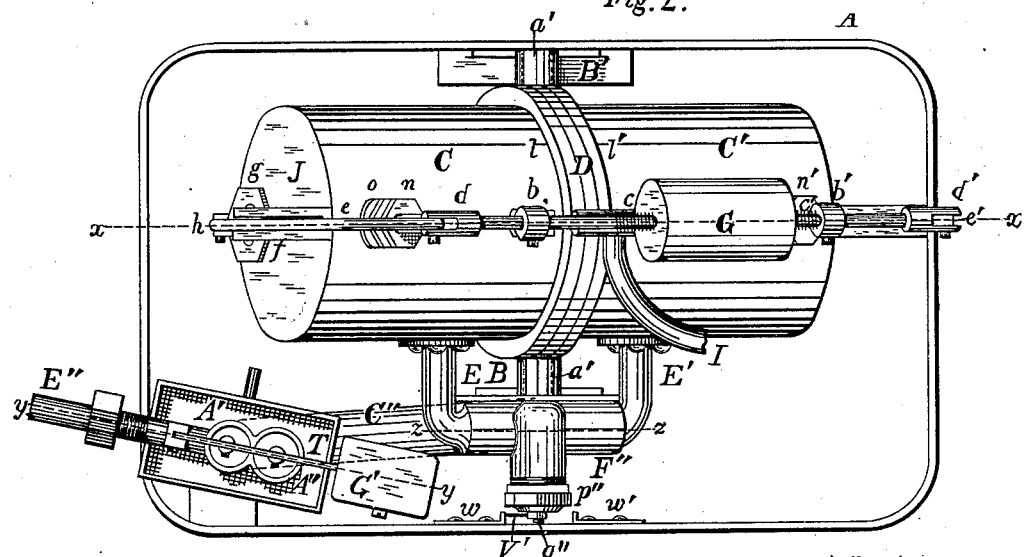

My improved air-compressor is represented in the accompanying drawings, in which Figure 1 is a side elevation. Fig. 2 is a plan view. Fig. 3 is a central vertical section on the line $x\,x$, Fig. 2. Fig. 4 is a vertical section through the pressure-regulator on the line $y\,y$, Fig. 2. Fig. 5 is a section through the water-inlet valve on the line $z\,z$, Fig. 2. Fig. 6 is an end view of the water-inlet valve. Fig. 7 is a section through one of the air-outlet valves on an enlarged scale. Fig. 8 is an end view of one of the water-outlet valves and its guide. Fig. 9 is a horizontal section through the water-inlet valve.

My improved air-compressor consists, essentially, of two air and water chambers, C C', attached together at their ends, and arranged to oscillate as one body about centrally-located pivots or trunnions turning in the supporting-frames B B', and suitable water and air inlet and outlet valves operated by the oscillating movements of the chambers.

In the accompanying drawings, A represents the trough which forms the base of my improved air-compressor; E" C", the water-inlet passages; F", the casing of the water-inlet valve; F F', the water-outlet valves; K K', the air-inlet passages; $p\,p'$, the air-outlet valves, and H I the pipes through which the compressed air is delivered. G and O are weights which are caused by the oscillating motion of the chambers to operate the water-outlet and air-inlet valves. W is a regulator for controlling the pressure at which the water is fed to the oscillating chambers.

The air and water chambers C C' are closed at their outer ends, J J', except for the insertion therein of the seats $g\,g'$ of the water-outlet valves, and at their inner ends they are provided with flanges $l\,l'$, by which they are secured to the division-plate D, suitable packing being interposed, if necessary. The plate D is provided with the trunnions $a'\,a'$, Fig. 2, which are fitted into journals in the supporting-frames B B', rising from the trough A, and permit the oscillation of the chambers thereon. In Fig. 1 the right-hand chamber, C', is represented as depressed to its lowest point, and in Fig. 3 the left-hand chamber, C, is shown in a corresponding position. In Fig. 1 the water is escaping from the chamber C' through the valve F', which is open, while the air is entering the chamber through the air-inlet valve and pipe K', and the water is entering the chamber C through the inlet-valve F", forcing the air therein through the air-outlet valve $p$ into the pipes H I. In Fig. 3 the position of the parts is reversed, the water being discharged from the chamber C, and entering chamber C' and forcing the air therein out through the air-exit pipes.

Water under pressure is supplied to the apparatus through the pipe E".

The pressure-regulator W consists of a closed chamber, Y, having the cylinders A' A" attached to its upper side or cover, an inlet-valve, X, and the pistons U and V, connected to the lever T and weight G', so that an increase or decrease of pressure in the chamber will open or close the valve X. In the sectional view of the regulator, Fig. 4, the parts are represented in position when the valve is closed in full lines, and the action of the mechanism in opening the valve and permitting the passage of water through the regulator from the supply-pipe E" to the flexible tube C", which connects with the water-inlet valve F"', is indicated by dotted lines. The cap or cover H, Fig. 1, of the pressure-regulator W is provided with the two cylinders A′ A″, the inlet-pipe E″ being connected with the cylinder A′ above the cover. The cylinders A′ and A″ are provided, respectively, with plungers or pistons V and U, packed with leather or other suitable packing, and connected by links or rods a″ a‴, Fig. 4, with the lever T of the connection T′, which is provided at its outer end with the adjustable weight G′, Figs. 1 and 2. The lower end of the connection T′ is pivoted at d″ to a lug on the cover. The links a″ a‴ may be provided with joints, if desired. The piston V is connected with the valve X by a jointed connection, e″. The lower side of the cover H′ is provided with a valve-seat, o″, against which the upper side of the valve X fits when the valve is closed. Any suitable packing may be employed in the valve X.

The operation of the pressure-regulator will be readily understood from an inspection of the drawings. When the pressure in the chamber Y, and consequently the pressure at which the water is delivered to the chambers c c′ through the pipe C″, exceeds the desired point, which is readily controlled by adjusting the weight G′ on the lever T, the piston U rises and closes the valve X against the valve-seat o″, thereby preventing the entrance of water into the regulator. When the pressure falls below the desired point, a contrary effect takes place—the valve X opens, as indicated by dotted lines in Fig. 4, and permits the water to flow from the pipe E″ into the chamber. The flexible tube C″ is connected to the chamber Y at one end, and at the other to the nozzle f″ on the valve-casing F‴, containing the water-inlet valve c″ c‴, Fig. 5. The valve-casing F‴ is attached to the chambers C and C′ by the pipes E and E′, and partakes of their oscillating movement, the flexible tube C″ yielding to permit the motion. The pipes E and E′ are fastened to the chambers C and C′ by suitable flange or other connections in such position that the center of the valve-casing F‴ comes opposite or in the same line with the center of oscillation of the chambers.

Provision is made for distributing the water from the tube C″ alternately to either chamber by means of the inlet-valve c″ c‴, which is operated by means of the pinion and rack m″ n″, Fig. 5, spindle q″, lever V′, and stops w w′, Figs. 1 and 2. The pipes E E′ extend into the valve-casing F‴, their inner ends forming seats for the valves c″c‴, respectively. The valves c″ c‴, which may be provided with suitable packing in their outer faces, and are notched for the free passage of water about them, as shown in the end view, Fig. 6, are connected together by the rack m″, Fig. 5. The spindle q″, which passes into the valve-casing, at right angles therewith, through a suitable stuffing-box, p″, carries at its inner end the pinion n″, meshing with the rack m″. The lever V′ is rigidly attached to the outer end of the spindle q″. The valve c″ c‴ is moved, so as to alternately open and close the passage from the valve-casing into the pipes E and E′ and the chambers C and C′, by the lever V′, which oscillates with the chambers, and at each end of its oscillation comes in contact with the stops w and w′, attached to the side of the trough A. When the chamber C rises and the chamber C′ falls, the end of the lever V′ comes in contact with the stop w, and the valve c″ is opened, so as to permit the flow of water through the pipe E into the chamber C, and the valve c‴ is closed. The position of the valves is represented in Fig. 5. When the chamber C′ rises and the chamber C falls, the lever V′ is swung over to V″, Fig. 1, coming in contact with the stop w′, and shifts the valves so as to open the valve c‴ into the pipe E′ and the chamber C′ and to close the valve c″. The stops w and w′ are attached to the trough A by bolts or screws passing through slotted holes, so that their position may be adjusted.

In order to check the oscillating motion of the chambers, I employ the spring-stops R R′, inserted in suitable sockets, Q Q′, in the bottom of the trough A.

Provision is made for discharging the water from the chambers C C′ by means of the outlet-valves F F′, operated by the weight G, rod a, and levers e e′. Into the ends of the chambers, near their lowest points, are inserted the valve-seats g and g′, which carry the arms f f′, to which the levers e e′ are pivoted. The levers e e′ extend upward along the end of the chambers, and are pivoted at their upper ends to the sockets d d′, attached to the rod a at each end thereof. The stems h h′ of the valves F F′ are pivoted to the lower ends of the levers e e′. The stems h h′ are jointed to permit the face of the valves F F′, provided with any suitable packing, i i′, to come in contact all around with the inner edges of the valve-seats g g′. Troughs or ways j j′ are formed on the valve-seats to support the valves during their motion. As the chamber C descends, the weight G, sliding on the rod a, forces the valve F open, allowing the water in the chamber to escape into the trough A, whence it flows off through the opening N. At the same time the valve F′ is closed by the action of the weight. In order to prevent any jar from the sudden stoppage of the weight, I place on the rod a the collars b b′, and interpose between the collar and the weight the springs c c′, which are partially compressed at each movement of the weight. The levers e e′ may be guided by the slotted arms k k′, extending outward from the ends of the chambers.

In order to allow the entrance of air into the chambers while the water is being discharged therefrom, I insert into the chambers the air-inlet pipes K K′, which are provided at their lower ends with the valves y y′, and extend vertically across the chambers, terminating above the upper side of the chambers in the recessed plugs L L′, Fig. 3, which are screwed into the chambers from above. The valves $y\ y'$ are worked from the weight O. The lower ends of the inlet-pipes K K' are formed into suitable valve-seats, and they also carry the arms $t\ t'$, to which the valves $y\ y'$ are pivoted. The valves $y\ y'$ consist of an arm extending inward and provided with suitable packing to close the inlet-passages K K', which packing may consist of a rubber ring stretched around the arm, the arms P P' extending downward and at right angles, or nearly so, with the arms forming the valves, and they are connected together at their lower ends by the rod $u'$, on which slides the weight O. Springs $v\ v'$ are placed on the rod $u$ on each side of the weight. When the chamber C descends, the weight O raises the valve $y'$ against the end of the air-inlet pipe K', preventing any escape through this pipe from the chamber C', and opens the valve, so as to permit the entrance of air into the chamber C. When the chamber C' descends, the operation is reversed, the valve $y$ being closed and the valve $y'$ being opened. The air is forced out of the chambers C and C' by the entering of water through the air-outlet valves $p$ and $p'$ and the pipes H and I. A flexible tube, I, is used to convey the air under pressure to any point where it is designed to be used. At the outer end of the chamber C there is inserted a threaded valve-seat, $l''$, Fig. 7, inclosing the valve $p$ and secured to the chamber by the nut $o$. The valve-seat $l''$ carries the arm $s$, so that it is necessary to insert it into the case from the inside when the chambers are taken apart. To the upper end of the valve-seat is attached the coupling-nut $n$, by which the socket $m$, which receives the pipe H, is secured to the valve-seat in a manner which permits of the removal of the valve $p$. To the lower end of the arm $s$ is pivoted the arm $q$, carrying at its free end the float $r$. The other end of the arm $q$ is bent up at right angles, forming a lug or shoulder, $t''$, Fig. 7, which prevents the arm $q$ from falling too far away from the lower end of the valve-seat $l''$. The arm $q$ is provided with a rubber ring, $x$, or other suitable packing, so that when the float $r$ is raised by the filling of the chamber with water the entrance of any water into the passage through the valve-seat is prevented. This action of the float is represented by the full and dotted lines in Fig 7. As the water flows out of the chamber, the arm $q$ falls and opens the passage through the valve-seat $l''$; but the air in the pipes H and I is not thereby permitted to re-enter the chamber, being prevented by the valve $p$, which is now closed down upon its seat. In order to permit a greater range of motion in the float $r$, the wall of the chamber C may be bent upward, as represented by the dotted lines $u'$ in Fig. 3.

The operation of the weight G in opening and closing the water-outlet valves F F' may be regulated and controlled by adjusting the collars $b\ b'$ on the rod $a$ by means of the set-screws in the collars. A similar device may, if desired, be used on the lower rod, $u$, to adjust the action of the weight O in opening and closing the air-inlet valves.

Instead of the piston U moving in the cylinder A'' of the regulator, a flexible diaphragm may be employed, connected with the lever T, so that any excess of pressure in the chamber Y will close the valve.

The flexible supply-pipe C'' permits of the oscillating motion of the valve-casing F''', attached to the oscillating chambers.

It is obvious that the two chambers C C' and the diaphragm D may be formed together by casting in one piece, that the chambers may be soldered to the diaphragm, or that they may be constructed in other ways without departure from the principles of my invention.

I do not intend to limit my claims to oscillating chambers attached to the diaphragm by flanges and bolts, as shown in the drawings hereto annexed.

The cover to the regulator is provided around its outer edge with an upwardly-projecting flange to retain any water that may escape from the cylinders A' A''. This is designed more particularly for use in places where it would be inconvenient to set the regulator over the trough A.

I claim—

1. In an air-compressor, the body composed of two cylindrical sections bolted at their inner ends to opposite sides of the diaphragm D, the latter being mounted and arranged to oscillate upon trunnions, as described and shown.

2. In combination with the cylinder, the inwardly-opening valve F, and the threaded externally-applied valve-seat $g$, provided with the internal arm or extension, J, adapted to engage with and serve as a guide for the valve F, whereby the guide is caused to move squarely against its seat.

3. The combination, with the oscillating chambers C C', of the water-inlet tubes E E', valve-casing F'', valves $c''\ c'''$, rack $m''$, pinion $n''$, spindle $q''$, lever V', and stops $w\ w'$, substantially as and for the purposes set forth.

4. In an air-compressor, the combination, with the oscillating chambers C C', of water-outlet valves F F', levers $e\ e'$, the rod $a$, connecting said levers, and weight G, as described, whereby the two valves are opened and closed alternately.

5. In an oscillating air-compressor, the means for effecting the opening and closing of the water-outlet ports, the same consisting of the valves F F', applied to the oscillating cylinder, the levers $e\ e'$, the connecting-rod $a$, provided with adjustable collars $b\ b'$, the springs $c\ c'$, and sliding weight G, substantially as described.

6. In an air-compressor, the combination of the oscillating chamber C C', air-outlet valves $p\ p'$, valves $x\ x'$, and weights $r\ r'$, substantially as described, whereby the automatic opening and closing of the air-outlet valves is effected.

7. The combination, with the chamber Y, of the cylinders A' A", pistons U and V, connected to lever T by rods $a''$ $a'''$, valve X, and inlet-pipe E", communicating with cylinder A' between the piston V and valve X, substantially as and for the purposes set forth.

8. The combination, with the oscillating chambers C C', of the air-inlet valves $y$ $y'$, and means, substantially as described, for operating the same, and the pipes K K', extending from the valves upward through the chambers and terminating within the recesses L L', substantially as described, whereby the admission of air to the chambers is permitted during the escape of water therefrom.

9. The combination of the oscillating chambers C C', air-inlet valves $y$ $y'$, levers P P', rod $u$, weight O, and the pipes K K', substantially as and for the purposes set forth, whereby the admission of air to the chambers is permitted during the escape of water therefrom.

10. In combination with the oscillating cylinder divided by a transverse partition, two independent chambers and independent valves for effecting the admission of air and of water and the discharge of air and of water, gravitating weights, applied as described, to control the air-inlet and water-outlet valves, the float applied to operate the air-outlet valves, and connections, substantially as described, whereby the air-inlet valves are controlled by the oscillating motion of the cylinder.

WILLIAM T. FOX.

Witnesses:
H. G. PHILLIPS,
GEO. B. SELDEN.